(12) United States Patent
Allamanis et al.

(10) Patent No.: US 12,197,896 B2
(45) Date of Patent: Jan. 14, 2025

(54) CODE GENERATION WITH REINFORCEMENT LEARNING

(71) Applicant: MICROSOFT TECHNOLOGY LICENSING, LLC., Redmond, WA (US)

(72) Inventors: Miltiadis Allamanis, Cambridge (GB); Daya Guo, Zhuhai (CN); Neelakantan Sundaresan, Bellevue, WA (US); Alexey Svyatkovskiy, Bellevue, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 0 days.

(21) Appl. No.: 18/386,934

(22) Filed: Nov. 3, 2023

(65) Prior Publication Data
US 2024/0061655 A1    Feb. 22, 2024

Related U.S. Application Data

(63) Continuation of application No. 17/403,583, filed on Aug. 16, 2021, now Pat. No. 11,836,467.

(60) Provisional application No. 63/210,971, filed on Jun. 15, 2021.

(51) Int. Cl.
*G06F 8/33* (2018.01)
*G06F 8/36* (2018.01)
*G06N 3/045* (2023.01)
*G06N 3/08* (2023.01)

(52) U.S. Cl.
CPC .................. *G06F 8/33* (2013.01); *G06F 8/36* (2013.01); *G06N 3/045* (2023.01); *G06N 3/08* (2013.01)

(58) Field of Classification Search
None
See application file for complete search history.

(56) References Cited

U.S. PATENT DOCUMENTS

| | | | |
|---|---|---|---|
| 11,340,898 B1 * | 5/2022 | Sabharwal | G06N 3/006 |
| 11,442,702 B2 * | 9/2022 | Smith | G06F 40/284 |
| 11,861,333 B2 | 1/2024 | Tabachnyk | |
| 2018/0349106 A1 | 12/2018 | Makkar | |
| 2019/0205763 A1 * | 7/2019 | Hirano | G06N 3/086 |
| 2019/0228319 A1 * | 7/2019 | Gupta | G06F 8/71 |

(Continued)

OTHER PUBLICATIONS

Chakraborty et al., "CODIT: Code Editing with Tree-Based Neural Models," IEEE, 2019, 14pg. (Year: 2019).*

(Continued)

*Primary Examiner* — Ryan D. Coyer

(57) ABSTRACT

A code generation system uses a non-terminal expansion model and a non-terminal selector model to generate a code sketch to complete a partially-formed source code snippet. The non-terminal expansion model is a neural transformer model trained on a supervised dataset through reinforcement learning to learn to predict the production rule to expand for a given non-terminal symbol. The non-terminal selector model is trained through reinforcement learning to predict the non-terminal symbol to expand given a partial-code state. The models are used in a two-step beam search to generate the top candidate code sketches, where a candidate code sketch may contain a hole that represents an unexpanded non-terminal symbol.

20 Claims, 13 Drawing Sheets

(56) References Cited

U.S. PATENT DOCUMENTS

| | | |
|---|---|---|
| 2019/0303107 A1 | 10/2019 | Kelly |
| 2019/0391792 A1* | 12/2019 | Sabharwal ............. G06N 3/045 |
| 2020/0097261 A1* | 3/2020 | Smith ................... G06F 40/174 |
| 2021/0026605 A1* | 1/2021 | Evangelopoulos .... G06N 3/084 |
| 2021/0034335 A1* | 2/2021 | Svyatkovskiy .......... G06N 5/02 |
| 2021/0349696 A1 | 11/2021 | Nupponen |
| 2022/0398071 A1 | 12/2022 | Allamanis et al. |
| 2023/0393817 A1 | 12/2023 | Johnson |

OTHER PUBLICATIONS

Le et al., "Deep Learning for Source Code Modeling and Generation: Models, Applications and Challenges," ACM, 2020, 37pg. (Year: 2020).*

Hussain, et al., Improving Source Code Suggestion with Code Embedding and Enhanced Convolutional Long Short-Term Memory, IET, Software, Mar. 2021, pp. 1-15.

Non-Final Office Action mailed on Apr. 11, 2024, in U.S. Appl. No. 17/842,725, 20 pages.

Notice of Allowance mailed on Aug. 13, 2024, in U.S. Appl. No. 17/842,725, 8 pages.

\* cited by examiner

1100

INITIALIZE THE BEAM (partial-code state, logprob, isDone)     1102
b <- { (x₀, 0, false) }

GENERATE EMBEDDINGS FOR THE PARTIAL-CODE STATE AND CONSTRUCT CONTEXT
TENSOR                                                        1104

WHILE THE BEAM CONTAINS INCOMPLETE GENERATIONS
while there exists (x, p, isDone) ∈ b with isDone = false do    1106

> INITIALIZE SET OF CANDIDATE CODE SKETCHES TO EMPTY
> b' <- { }                                                     1108
>
> FOR EACH SAMPLE IN THE BEAM                                   1110
> For (x, p, isDone) ∈ b do
>
>> IF CODE SKETCH IS COMPLETE,, THEN CONTINUE                   1112
>> If isDone then b' <- b' U {(x, p, isDone)} continue
>>
>> GET TOP-M NON-TERMINAL POSITIONS (First-step beam search) 1114
>> For i ∈ TOPM ( Ps (i | x, N(x))) do
>>
>>> ps <- log Ps (i | x, N(x))                                  1116
>>>
>>> if i = special stop symbol then b' <- b' U { ( x, p + ps, true)}
>>> else                                                        1118
>>>
>>>> for y ∈ TOPN (Pe (y|x,i)) do (Second-step beam search)  1120
>>>> pe <-Pe(y|x,i)                                            1122
>>>> b' <- b' U {( x<i :: y :: x>i), p+ps+pe, false)}          1124 b <- TOPK( b')                                                  1126 b_out <-NonTermnalToHoles(b)                                    1128

Return b_OUT                                                    1130

*FIG. 11*

CODE GENERATION WITH REINFORCEMENT LEARNING

CROSS-REFERENCE TO RELATED APPLICATIONS

The present application is a continuation of U.S. application Ser. No. 17/403,583 filed on Aug. 16, 2021 which claims the benefit of the earlier filed provisional application having Ser. No. 63/210,971 filed on Jun. 15, 2021, both of which are incorporated by reference in their entirety.

BACKGROUND

Software development environments are often used to aid software developers (i.e., users, programmers, etc.) to develop program code. The software development environment may include a source code editor and other tools that a developer utilizes to write and test their programs. Some software development environments include a feature that provides assistance while the developer is editing code by automatically presenting a list of possible candidates to complete a partially-formed code snippet based on one or more characters (e.g., letters, symbols, etc.) that a developer has typed into the source code editor. A popup menu may appear with several suggestions that the developer may utilize. This assistance is beneficial since it speeds up the development time and reduces common errors, such as typos.

At times, the suggested code snippets may appear to generate realistic-looking source code but the realistic-looking suggestions may hallucinate and generate plausible but incorrect suggestions. The incorrect suggestions confuse the user, introduces errors and negatively impacts the user's experience with the software development environment.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A code generation system generates one or more candidate code sketches, or source code snippets with zero, one or more holes, given a partially-formed source code snippet. The code generation is a grammar-guided system that relies on a non-terminal selector model to predict whether a non-terminal symbol can be expanded and the positions of the M most likely non-terminals in a partial-code state to expand and a non-terminal expansion model that predicts the N most likely expansions for a selected non-terminal.

The non-terminal selector model $P_s$ is a multilayer perceptron model that is pre-trained via reinforcement learning using a reward that is based on self-critical policy gradient learning using evaluation metrics given a predicted code sketch and the true terminal sequence. The non-terminal expansion model $P_e$ is a neural transformer model with attention that autoregressively generates a code sketch given the non-terminal index to expand from the non-terminal selector model and a partial-code state. The non-terminal expansion model is pre-trained to learn how to expand a selected non-terminal symbol and is trained through reinforcement learning.

During inference, the code generation system generates candidate code sketches using a first beam search that uses the non-terminal selector model to find the M most likely non-terminals in the partial-code state to expand and a second beam search that uses the non-terminal expansion model to find the N most likely expansions of each of the M most likely non-terminals. The first and second beam searches are made for each partial-code sketch that is generated during the search until a special stop token is predicted by the non-terminal selector model or there are no terminal symbols in a partial-code sketch.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF DRAWINGS

FIG. 11 is a flow diagram illustrating an exemplary method for performing a two-step beam search to generate one or more code sketches given a partially-formed code snippet.

DETAILED DESCRIPTION

Overview

Figure 1:
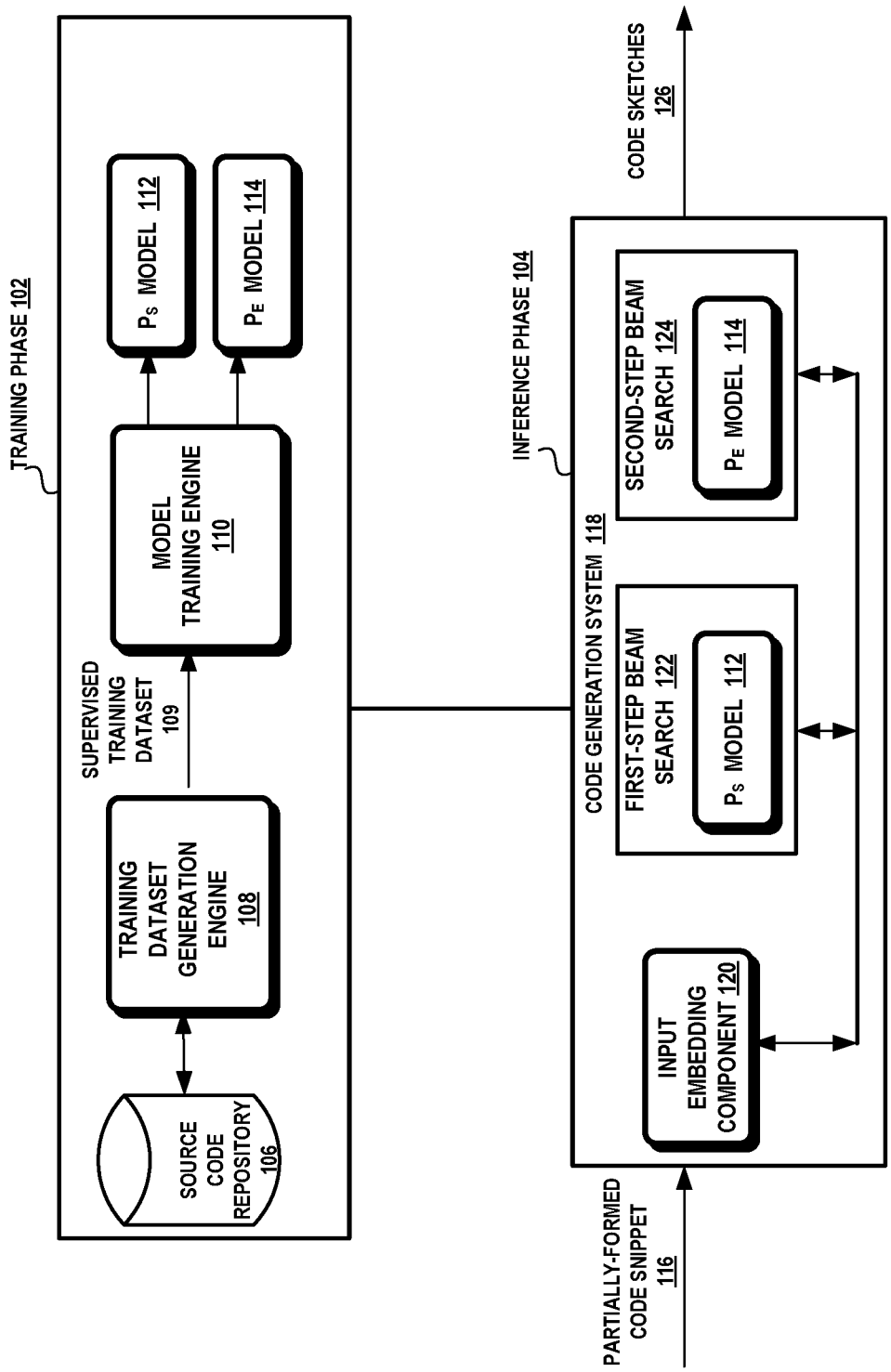
FIG. 1 illustrates an exemplary code generation system having a training phase that trains a non-terminal expansion model and a non-terminal selector model and an inference phase that uses the models to generate source code.

A code generation system is disclosed that generates code sketches or source code snippets given a partially-formed source code snippet. A code sketch is a syntactically-correct source code snippet with zero, one or more holes that completes a partially-formed source code snippet. The hole represents where the code generation system is uncertain about the element or elements that should be placed in a particular position in the suggested source code snippet to reflect the user's intent. A partially-formed source code snippet is represented as a partial-code state having a sequence of symbols or tokens with at least one non-terminal symbol. The partially-formed source code snippet may represent a partially-formed source code expression, a partially-formed method signature, a partially-formed method body, a partially-formed source code statement, or a partially-formed group of consecutive source code statements.

The technique described herein relies on the production rules of the grammar of a programming language to predict the syntactically-correct code to complete a partially-written code snippet. A context-free programming language relies on its context-free grammar to describe how to construct syntactically-correct source code. A context-free grammar, G, is defined by a 4-tuple, $G=(\Sigma, N, R, S)$, where $\Sigma$ is the set of terminal symbols, N is the set of non-terminal symbols, R is the set of production rules of the grammar, and S is the start or root non-terminal symbol used to represent the entire program. A terminal symbol is a symbol that appears in the strings generated by the grammar. A terminal symbol never appears on the left-hand side of a production rule and is always on the right-hand side. A non-terminal symbol is a placeholder for patterns of symbols that can be generated by the non-terminal symbols. A non-terminal symbol always appears on the left-side of a production rule. A production rule is a rule for replacing a non-terminal symbol. A grammar is context-free if a production rule can be applied regardless of the context of the non-terminal.

The technique described herein generates code based on the programming language grammar, instead of generating code tokens left-to-right or on a linearized form of a syntax tree. Instead, the technique selects which, if any, non-terminal symbol to expand and which production rule to expand the selected non-terminal symbol.

Consider the following partially-formed source code snippet 100 written in the Python programming language:

```
import argparse
ap = argparse.ArgumentParser( )
ap.add_argument("–release ", action= "store_true ")
ap.add_argument("–prerelease ", action= "store_true ")
```

The partially-formed source code snippet above includes the following statements: an import statement, import argparse; an assignment statement, ap=argparse.ArgumentParser( ), that assigns the result of the method call, argparse. ArgumentParser( ), to variable ap; a first method invocation to ap.add_argument with two parameters, ap.add argument("—release", action="store_true"); and a second method invocation to ap.add_argument with two parameters, ap.add_argument("—prerelease", action="store_true").

A traditional language model generates text or source code by expanding the left-most, bottom-most non-terminal symbol, using one of the production rules of the grammar of the programming language. A traditional language model would return the source code snippet ap.add_argument( ) as the suggestion to continue the partially-formed source code snippet. This source code snippet only partially captures the user's intent. By contrast, the technique disclosed herein generates the source code snippet ap.add_argument (■, action="store_true") containing a hole at the location where the model is uncertain about the actual form of the code while correctly suggesting the second parameter/argument. The user can then fill-in the hole based on their intent.

The technique uses two deep learning models: a non-terminal selector model Ps (i|x), that predicts the position of the non-terminal i to expand in a given sequence x of terminal and non-terminal symbols, where $i \in N(x)$, where N is a set of non-terminals; and a non-terminal expansion model Pe (y|x, i) that generates the expansion sequence $y=y_1, y_2, \ldots$, of the selected non-terminal i, where $y \in \cup N$, and $\Sigma$ is the set of terminal symbols. In one aspect, the non-terminal selector model is a multilayer perceptron model (MLP) and the non-terminal expansion model is a neural transformer model with attention. A MLP is a feed-forward neural network having at least three layers of nodes: an input layer; a hidden layer; and an output layer. The nodes of the hidden layer and the output layers contain non-linear activation functions that utilize weights and biases that are learned during training and fine-tuning.

Machine learning pertains to the use and development of computer systems that are able to learn and adapt without following explicit instructions, by using algorithms and statistical models to analyze and draw inferences from patterns in data. Machine learning uses different types of statistical methods to learn from data and to predict future decisions. Traditional machine learning includes classification models, data mining, Bayesian networks, Markov models, clustering, and visual data mapping.

Deep learning differs from traditional machine learning since it uses multiple stages of data processing through many hidden layers of a neural network to learn and interpret the features and the relationships between the features. Deep learning embodies neural networks which differs from the traditional machine learning techniques that do not use neural networks.

A neural transformer with attention is a distinct type of deep learning model that utilizes an attention mechanism. Attention directs the neural network to focus on a subset of features or tokens in an input sequence thereby learning different representations from the different positions of the tokens in an input sequence. The attention mechanism provides the model with a better capability to learn the task at hand thereby generating more accurate predictions of the candidate method bodies.

The non-terminal expansion model, Pe, learns how to expand the production rules through a supervised training dataset of tuples. A tuple includes a partial-code state, a non-terminal index to expand, and the outcome of the expansion. During training, the model learns the one-step expansion of a production rule by modeling a probability distribution, Pe (expansion|c, s), where c is the partial-code state and s is the index of the non-terminal being expanded. The non-terminal selector model, Ps, learns the production rules and how to select a production rule for a given context through reinforcement learning.

When the model is deployed in a code generation system, the non-terminal selector model $P_s$ and the non-terminal expansion model Pe are used within a two-step beam search to generate code sketches given a partially-formed source code snippet. The number of the best partial solutions that are considered in each beam search is k, the beam size. In the first beam search step, the top-M non-terminal positions to expand for a given token sequence $x_t$ is predicted by the non-terminal selector model Ps. For each of these m positions, the top-N expansions are predicted by the non-terminal expansion model, Pe. For all the k*N*M combinations, the likelihood of each combination is computed and the top-k predictions are kept and output to the user.

Attention now turns to a further discussion of the system, devices, components, and methods utilized in the code generation system.

Code Generation System

FIG. 1 illustrates a block diagram of an exemplary code completion system 100 in which various aspects of the invention may be practiced. As shown in FIG. 1, system 100 includes a training phase 102 in which components are used to train the machine learning models, and an inference phase 104 that utilizes the models for source code generation.

The training phase 102 may utilize one or more source code repositories 106, a training dataset generation engine 108 and a model training engine 110 that generates the non-terminal selector model Ps 112 and the non-terminal expansion model Pe 114. The non-terminal expansion model 114 is trained from a supervised training dataset 109 that consists of tuples derived from various source code programs from various source code repositories 106. A source code repository 106 may be a file archive and web hosting facility that stores large amounts of source code either privately or publicly. The source code repository 106 can be structured as a version control system, such as GIT, Mercurial, etc.

The training dataset generation engine 108 extracts source code programs from the various source code repositories 106 to construct a supervised training dataset to train the non-terminal expansion model 114. In one aspect, the supervised training dataset 109 includes tuples, where a tuple includes a partial-code state, a position of a non-terminal position to expand, and the true non-terminal expansion. The model training engine 110 applies the tuples of the supervised training dataset 109 to the non-terminal expansion model 114 to learn how to expand the production rules of the programming language. A partial-code state corresponds to a linearization of the leaves of a partially-expanded syntax tree of a source code snippet. The partial-code state includes at least one non-terminal symbol that has yet to be expanded and zero or more terminal symbols.

The model training engine 110 also trains the non-terminal selector model 112 to learn how to select a non-terminal symbol for expansion. The non-terminal selector model 112 is a multilayer perception model or feed-forward neural network configured to predict a non-terminal position to expand and is represented mathematically as $P_s(i|x_t)$=softmax $i \in N(x_t)$ $(f(E(x_t)_i))$, where f is a feed-forward network and $E(x_t)_i$ is the encoded representation of the non-terminal position at i.

Once both models are trained and validated, the models are deployed in the inference phase 104 in a code generation system 118. The code generation system 118 receives a partially-formed code snippet 116 which is transformed by an input embedding component 120 into an embedded input sequence for which code sketches 126 are generated.

The code generation system may be embodied as a code completion tool in a source code editor, Integrated Development Environment (IDE), or the like.

It should be noted that FIG. 1 shows components of the system in one aspect of an environment in which various aspects of the invention may be practiced. However, the exact configuration of the components shown in FIG. 1 may not be required to practice the various aspects and variations in the configuration shown in FIG. 1 and the type of components may be made without departing from the spirit or scope of the invention.

Code Generation Model Training

Attention now turns to a description of the methods used to train the non-terminal expansion and selector models.

Figure 2:
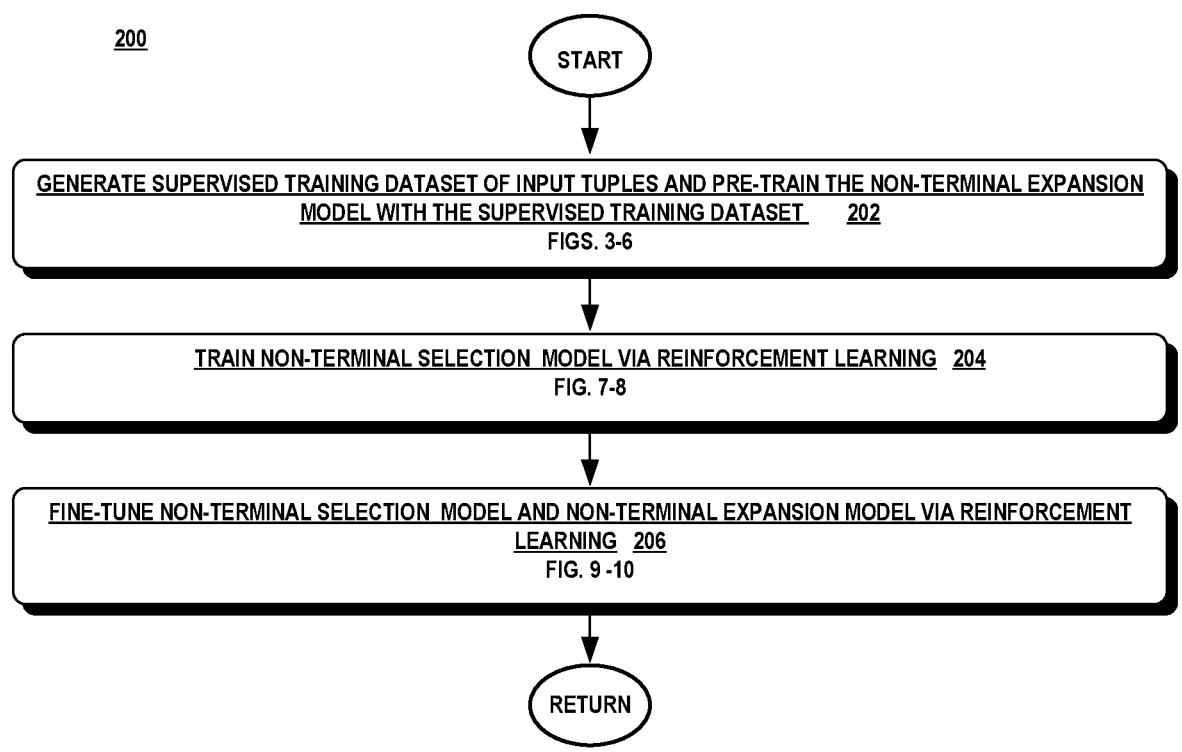
FIG. 2 is a flow diagram illustrating an exemplary method for training the non-terminal expansion model and the non-terminal selector model.

Turning to FIG. 2, there is shown an exemplary method 200 of generating the non-terminal expansion model and the non-terminal selector model. The supervised training dataset is generated and then used to pre-train the non-terminal expansion model (block 202). The non-terminal selector model is then pre-trained using reinforcement learning (block 204). The joint model is then fine-tuned using the reinforcement learning (block 206).

Supervised Training Dataset Generation

Figure 3:
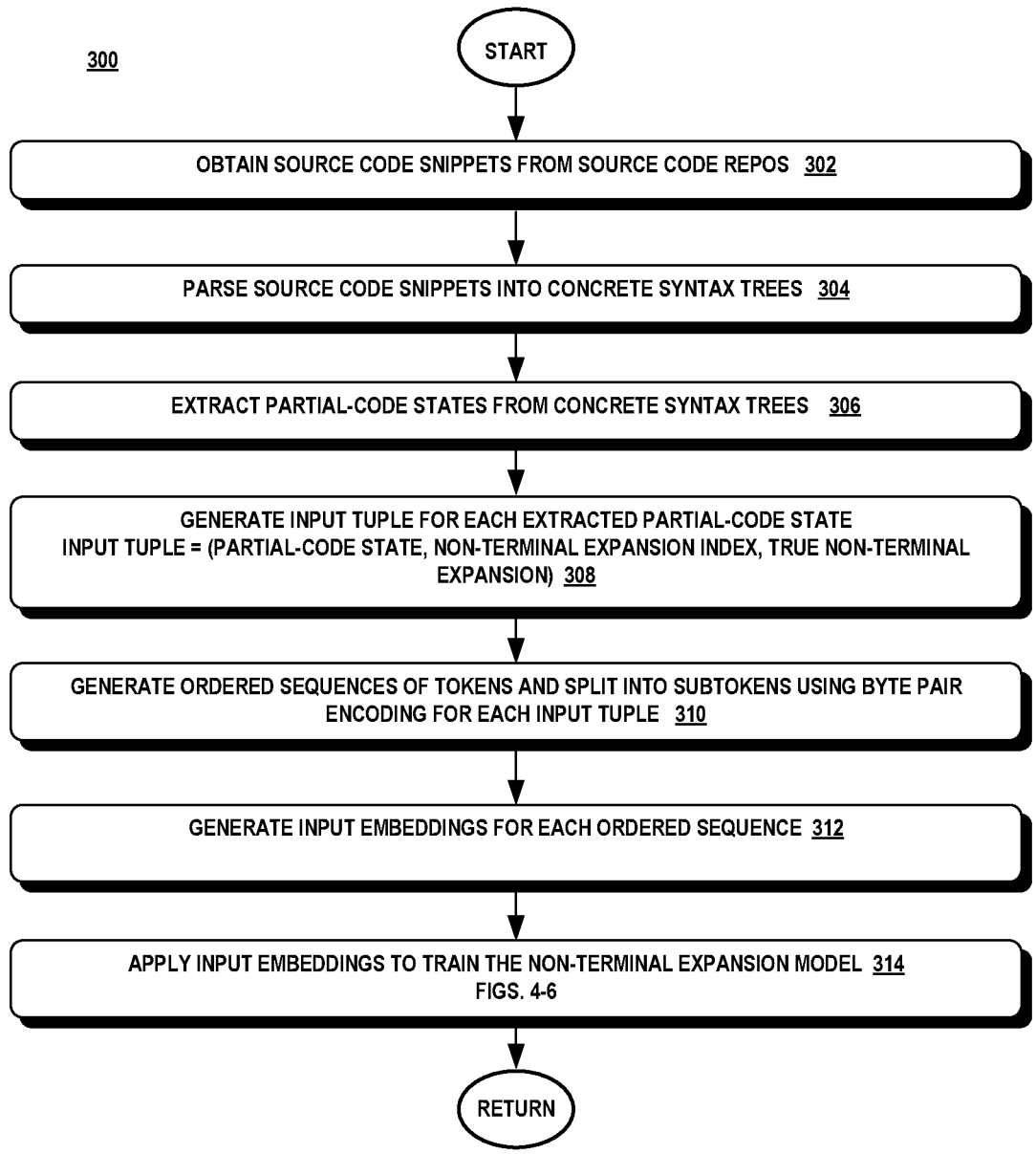
FIG. 3 is a flow diagram illustrating an exemplary method for generating the supervised training dataset to train the non-terminal expansion model.

Turning to FIG. 3, there is shown an exemplary method 300 of the training dataset generation engine 108 for generating the training dataset. The training dataset generation engine 108 obtains source code snippets from various source code repositories (block 302). In one aspect, the source code snippets are written in the same programming language (block 302).

The training dataset generation engine 108 transforms each of the selected source code programs into a concrete syntax tree. A concrete syntax tree represents the syntactic structure of a program in a hierarchical or tree structure. The concrete syntax tree is an n-ary tree data structure that includes nodes that represent a construct in the grammar of the programming language of a program. The concrete syntax tree includes one root node, multiple internal nodes, and multiple terminal nodes. The terminal nodes represent the terminal symbols. The terminal symbol represents an operand or an operator. The non-terminal nodes represent elements of the grammar on the left-side of a production rule. (Collectively, block 304).

The training dataset generation engine 108 extracts partial-code states from the concrete syntax tree. A partial-code state represents a linearization of the leaves of a partially-expanded syntax tree. A partial-code state contains at least one non-terminal symbol that has yet to be expanded. Expansion pertains to the application of a production rule to a non-terminal symbol. (Collectively, block 306).

For each partial-code state, an input tuple is formed consisting of the partial-code state, a non-terminal expansion index, and a true non-terminal expansion. The non-terminal expansion index represents the position of the non-terminal that the model learns to expand. The non-terminal expansion index is randomly selected and does not adhere to any particular order, such as a left-to-right expansion order. (Collectively, block 308).

Figure 4:
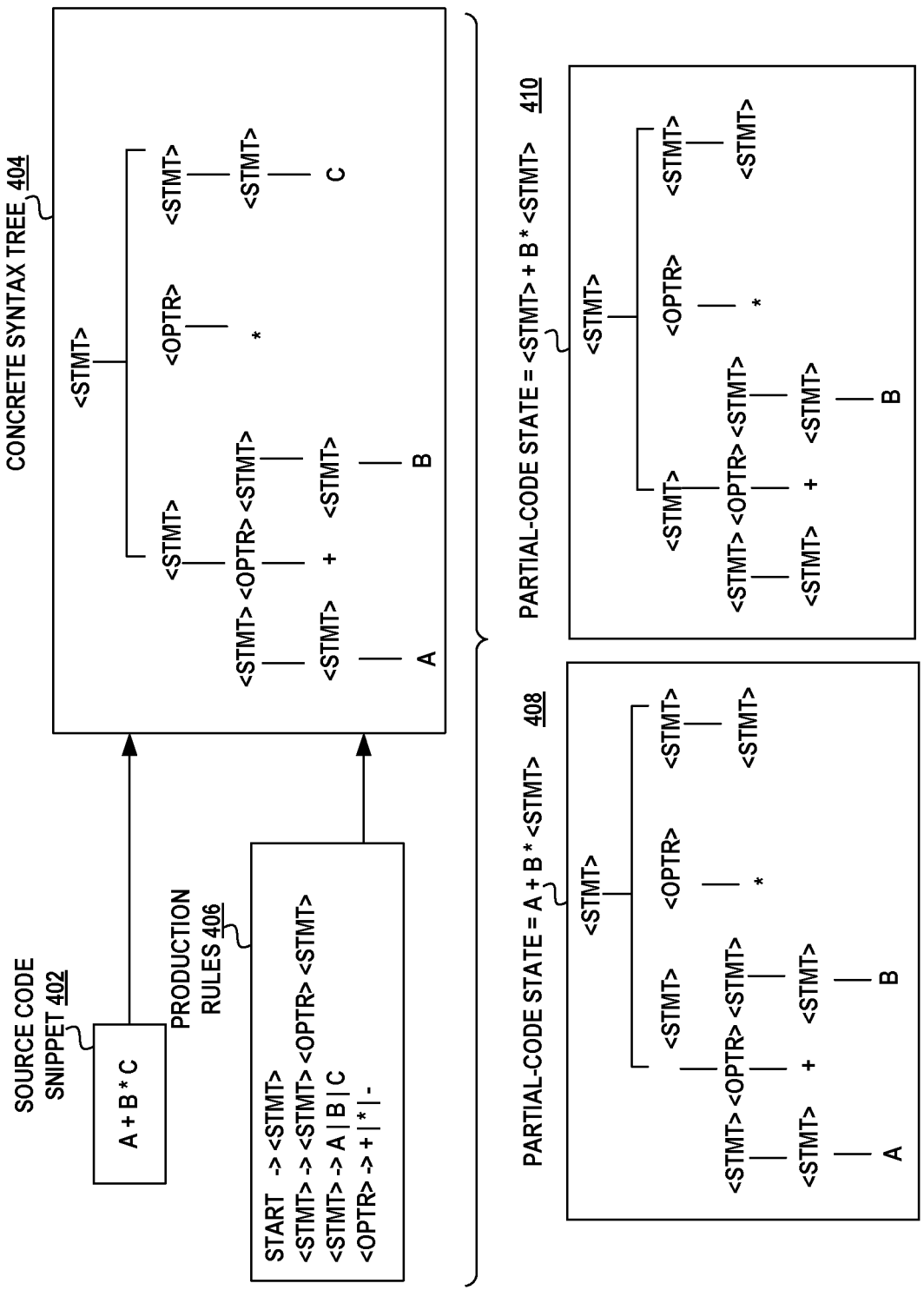
FIG. 4 is a schematic diagram illustrating a partial-code state.

FIG. 4 illustrates a partial-code state. In the example shown in FIG. 4, there are four production rules 406 in the grammar. The non-terminal symbols include <STMT> or statement and <OPTR> or operator. The terminal symbols include A, B, C, *, +, and −.

The production rule START-><STMT> expands the START state to the non-terminal symbol <STMT>. The production rule <STMT>-><STMT><OPR><STMT> expands the non-terminal symbol <STMT> with the non-terminal symbols <STMT><OPR><STMT>. The production rule <STMT>->A, expands the non-terminal symbol STMT with the terminal symbol A, the production rule <STMT>->B, expands the non-terminal symbol STMT with the terminal symbol B and the production rule <STMT>->C, expands the non-terminal symbol STMT with the terminal symbol C. The production rule <OPTR>->*, expands the non-terminal symbol OPTR to the terminal symbol *, the production rule <OPTR>->+ expands the non-terminal symbol OPTR to the terminal symbol +, and the production rule <OPTR>->−, expands the non-terminal symbol OPTR to the terminal symbol −.

In a context-free grammar, each production rule is applied to each non-terminal symbol by starting from the left-most symbol of a production rule and applying the translation noted in the right-hand side of the production rule. The production rule START-><STMT> is applied first and then the non-terminal <STMT> is expanded using additional production rules until only non-terminal symbols remain. The application of the production rules 406 implicitly creates the concrete syntax tree 404 for the source code snippet 402.

Two exemplary partial-code states can be constructed from the concrete syntax tree 404. It should be noted that there are additional partial-code states and that these are shown for illustration purposes and should not be construed as limiting the example to the partial-code states shown. A partial-code state is a partially-expanded concrete syntax tree that includes at least one non-terminal. The two partial-code states are, A+B*<STMT> 408 and <STMT>+B*<STMT> 410. The concrete syntax tree shown in 408 contains some expanded leaf nodes and the non-terminal symbol <STMT> that has not been expanded to terminal symbol C. The concrete syntax tree shown in 410 contains some expanded leaf nodes and the non-terminal symbol <STMT> that has not been expanded to the terminal symbol A and the non-terminal symbol <STMT> that has not been expanded to the terminal symbol C.

Returning back to FIG. 3, each input tuple is then tokenized and split into subtokens using byte-level byte-pair encoding. Byte-level byte-Pair Encoding (BPE) is used to generate the vocabulary used by a neural transformer model. A text string, either a sequence of source code or a natural language text, is represented as a sequence of Unicode Transform Format, UTF-8 bytes. The input text string of subtokens is encoded as a sequence of UTF-8 bytes, where a subtoken is encoded into one to four bytes. A byte sequence is then partitioned into byte-level subwords, referred to as byte n-grams. (Collectively, block 310).

The byte-level subwords are generated using the BPE algorithm. The vocabulary is seeded with 256 American Standard Code for Information Interchange (ASCII) characters and then greedily grown by adding the merge of the most common pair of consecutive tokens in each iteration. This type of encoding does not rely on knowing the underlying language making it suitable for an input sequence of text strings that contain source code and/or natural language text. The ordered sequences of UTF-8 bytes are translated into a T-ordered sequence of subtokens which are vector representations of a source code fragment or natural language text. The T-ordered sequence of subtokens is represented in a context vector. (Collectively, block 310).

The T-ordered sequences of tokens are then mapped into numeric vectors and then into an embedding. An embedding is a learned representation for the text-based tokens/subtokens where tokens or subtokens that have a common meaning have a common representation. There is an embedding for each token/subtoken in the vocabulary and a position embedding. The token/subtoken embedding represents the learned representation for the token/subtoken. The transformer model does not read each token/subtoken sequentially and as such, has no knowledge of the token/subtoken's position in a sequence without additional position information. The position embedding is used to embed position information about a token/subtoken's position in a sequence into the transformer model. (Collectively, block 312).

The token/subtoken embeddings are input to the model training engine to train the non-terminal expansion model (block 314).

Pre-Training the Non-Terminal Expansion Model

Neural networks are trained iteratively, making multiple passes over the training dataset before converging to a minimum. An epoch represents the entire training dataset passed forwards and backwards through the neural network once. Since the training dataset is very large, it is partitioned into smaller batches. The training is iterative and the entire dataset is passed through the neural network in multiple iterations. Each training iteration includes forward propagation, loss calculation, backpropagation steps followed by updating the weights.

The neural network has multiple layers so that more detailed relationships within the data are learned as well as how the features interact with each other on a non-linear level. The model architecture, training procedure, data normalization and vocabulary encoding procedures are hyperparameters that are tailored to meet a particular objective. The values of the hyperparameters influence how the parameters are learned.

In one aspect, the hyperparameters may include the following: (1) token/subtoken and position embedding layers of dimensions: 30000×768, and 1024×768 respectively; (2) 6 encoder and 6 decoder transformer blocks, with each block consisting of a two-layer multilayer perceptron (feed-forward neural network 514, 530), masked self-attention and layer normalization layers; the decoder blocks would also contain encoder-decoder attention layers 526; (3) for the training procedure: auto-regressive, with a cross-entropy loss optimization objective; the sequence length is 1024 tokens/subtokens; the mini-batch size is 8; the gradient accumulation steps for each weight update is 8; the Adam stochastic optimization procedure is used to train the neural network; and the learning rate is 0.0001; (4) and (5) the vocabulary encoding procedure: extract joint subtoken vocabulary using byte-pair encoding; and introduce special tokens to denote a stop symbol.

Figure 5:
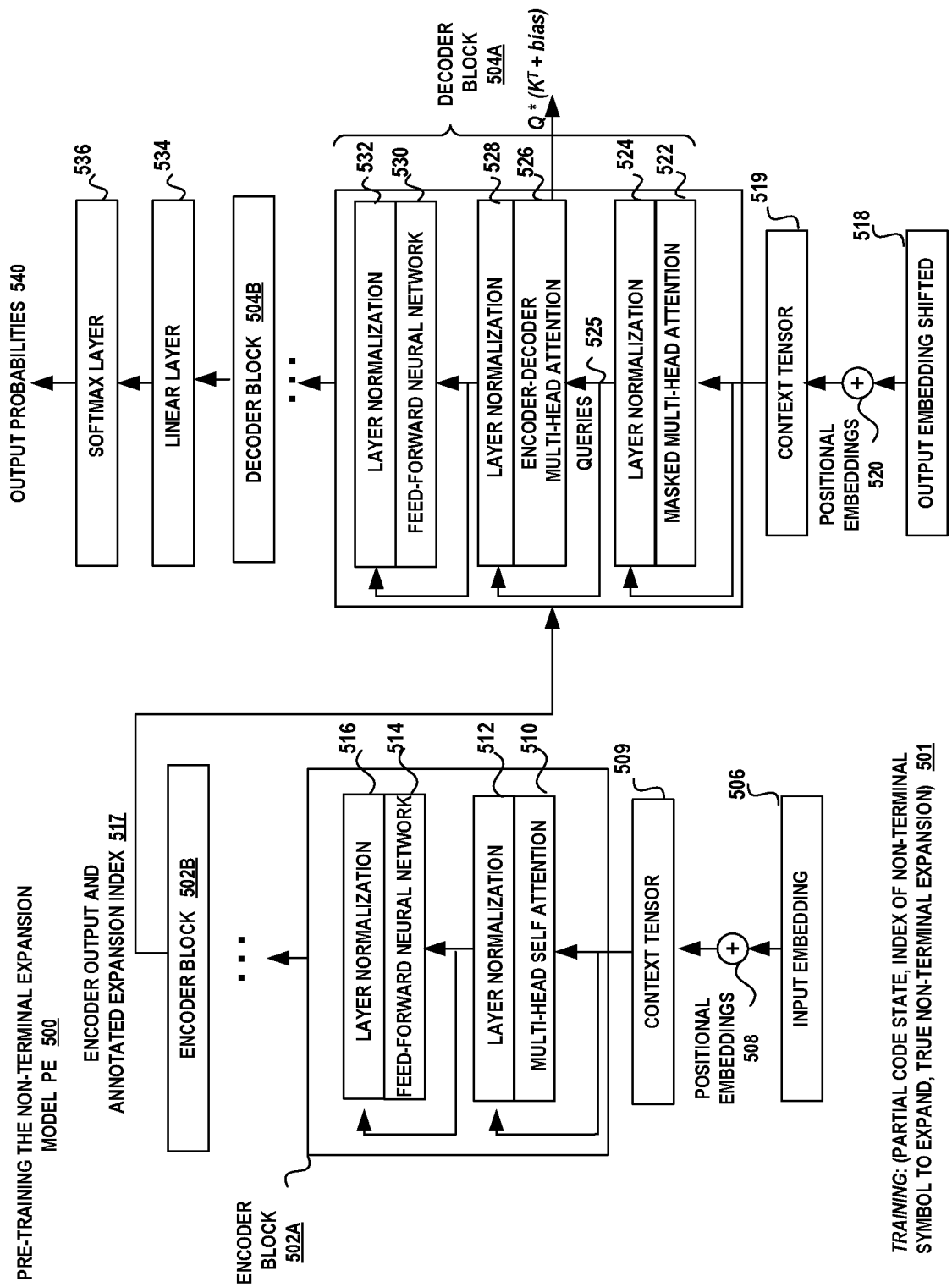
FIG. 5 is an exemplary configuration of the non-terminal expansion model for pre-training.

FIG. 5 illustrates an exemplary configuration of the non-terminal expansion model. In one aspect, the non-terminal expansion model is a neural transformer model having one or more encoder blocks 502A-502B ("502") coupled to one or more decoder blocks 504A-504B ("504"). The initial inputs to an encoder block 502 are the input embeddings 506 of an input sequence of a training dataset. The input sequences consist of tuples 501, where each tuple includes a partial-code state, an index of the position of the non-terminal symbol in the partial-code state to expand, and the true expansion of the indicated non-terminal symbol). The index of the non-terminal expansion is randomly sampled from a uniform distribution over the non-terminals in the partial-code state, $x_i$, except from the special stop symbol.

In order to retain the order of the tokens in the input embedding 506, positional embeddings 508 are added to the input embedding 506 forming a context tensor 509. The initial inputs to the decoder block 504 are a shifted sequence of the output embeddings 518 from a previous time step to which the positional embeddings 520 are added forming context tensor 519.

An encoder block 502 consists of two layers. The first layer includes a multi-head self-attention component 510 followed by layer normalization component 512. The second layer includes a feed-forward neural network 514 followed by a layer normalization component 516. The context tensor 509 is input into the multi-head self-attention component 510 of the first encoder block 502 with a residual connection to the layer normalization component 512. The output of the layer normalization component 512 is input to the feed-forward neural network 514 with another residual connection to layer normalization component 516. The output of the encoder block 502 is a context tensor or set of hidden representations 517. The set of hidden representations 517 is then sent through additional encoder blocks. At the last encoder block, a context tensor 517 is sent to the decoder 504.

Attention is used to decide which parts of the input embedding are important for each token, especially when decoding long sequences since the encoder is limited to encoding a fixed-size vector. Attention mechanisms gather information about the relevant context of a given token and then encode that context into a vector which represents the token. It is used to identify the relationships between tokens in the long sequence while ignoring other tokens that do not have much bearing on a given prediction.

The multi-head self-attention component 510 takes a context tensor 509 and weighs the relevance of each token represented in the context tensor 509 to each other by generating attention weights for each token in the input embedding 506. In one aspect, the attention function is scaled dot-product attention which is described mathematically as follows:

$$\text{Attention}(Q, K, V) = \text{softmax}\left(\frac{QK^T}{\sqrt{d_k}}\right)V,$$

where the input consists of queries Q and keys K of dimension $d_k$, and values V of dimension $d_v$. Q is a matrix that contains the query or vector representation of one token in a sequence, K is the vector representations of all tokens in the sequence, and V is the vector representations of all the tokens in the sequence.

The queries, keys and values are linearly projected h times in parallel with $d_v$ output values which are concatenated to a final value:

MultiHead(Q,K,V)=Concat(head$_1$, . . . ,head$_h$)$W^O$, where head$_i$=Attention($QW_i^Q,KW_i^K,VW_i^V$), with parameter matrices $W_i^Q \in \mathbb{R}^{d_{model} \times d_k}$, $W_i^K \in \mathbb{R}^{d_{model} \times d_k}$, $W_i^V \in \mathbb{R}^{d_{model} \times d_k}$, and $W^O \in \mathbb{R}^{hd_v \times d_{model}}$.

Layer normalization is used between the layers. The layer normalization components 512, 516 normalize the inputs across the features. The mean and standard deviation is computed across the feature dimensions.

The feed-forward neural network 514 processes each output encoding separately. The output of the top encoder block is a set of attention vectors K and V 517 which is used by the encoder-decoder multi-head attention layer 526 of the decoder block 504.

The decoder block 504 predicts a token $t_i$ representing a symbol in the grammar of the target programming language one-by-one at each time step conditioned on all previously-generated target tokens $t_1$, . . . , $t_{i-1}$. A decoder block 504 consists of three layers. The first layer includes a masked multi-head attention component 522 followed by a layer normalization component 524. The output of the layer normalization component 525 is input into the encoder-decoder multi-head attention component 526 with a residual connection to layer normalization component 528. The second layer includes an encoder-decoder multi-head attention component 526 followed by a layer normalization component 528. The third layer includes a feed-forward neural network 530 followed by a layer normalization component 532. The output of layer normalization component 528 is input into the feed-forward neural network 530 with a residual connection to layer normalization component 532.

The output of the last decoder block 504B is input into linear layer 534 that projects the vector produced by the stack of decoders into a logits vector. The softmax layer 536 then turns the scores of the logits vector into output probabilities 540 for each subtoken in the vocabulary which are positive and normalized.

The masked multi-head attention component 522 receives the output embeddings of the previous timestep. The masked multi-head attention component 522 masks the output embeddings from future time steps. The encoder-decoder multi-head attention layer 522 receives queries from the previous decoder layer and the memory keys and values 517 from the output of the encoder block 502. In this manner, the decoder block 504 can attend to every position of the input sequence. The feed-forward neural network 530 processes each output encoding separately. A layer normalization component 524, 528, 532 is used between the layers in order to normalizes the inputs across the features.

In one aspect, the neural transformer model contains a stack of six encoder blocks and a stack of six decoder blocks which are aggregated into a neural transformer block. The output of each encoder block is passed onto the next encoder block and processed. Each decoder block receives the attention weights computed from the last encoder block. The use of multiple stacked encoder blocks and decoder blocks increases the model's capacity allowing the model to learn increasing levels of abstraction.

Figure 6:
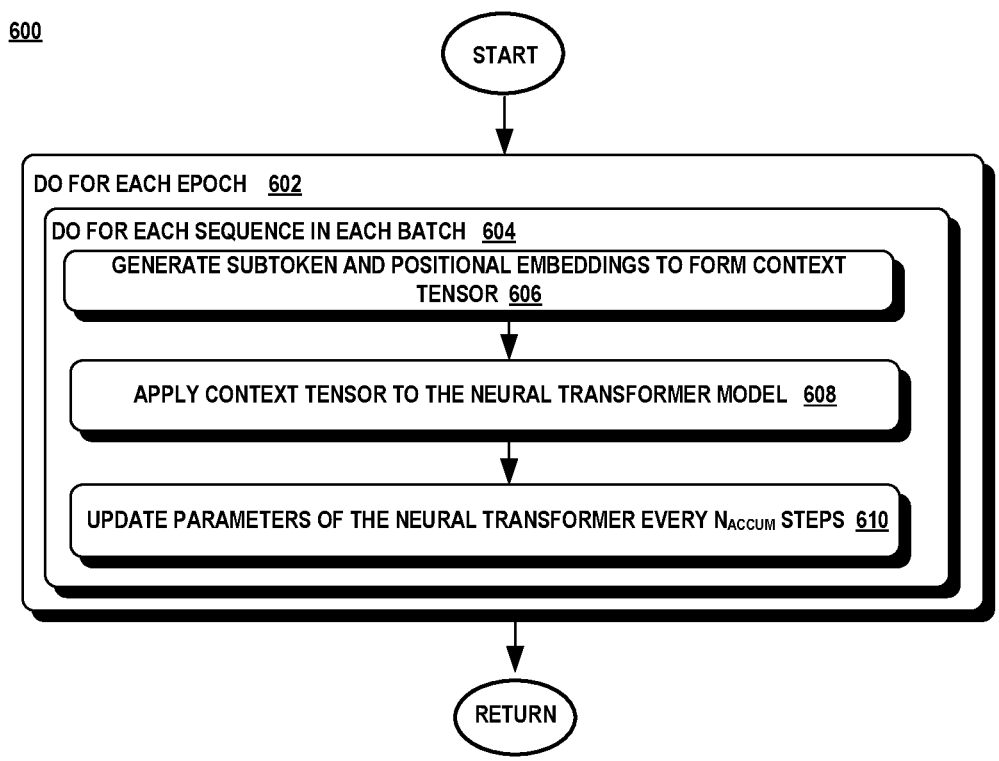
FIG. 6 is a flow diagram illustrating an exemplary method for training the neural transformer model of FIG. 5.

FIG. 6 shows an exemplary method 600 for pre-training the non-terminal expansion model. The training dataset is partitioned into batches with each batch of sequences running through the training process. The sequences are initially transformed into numeric vectors and then embeddings. An embedding is a mapping of discrete categorial variables to a vector of continuous numbers. There is a token/subtoken embedding and a positional embedding for each input sequence. The token/subtoken embeddings represent the tokens and/or subtokens in an input sequence and the positional embeddings represents the order of a token/subtoken in an input sequence.

Initially, random values are used for the initial values of each token/subtoken embedding and positional embedding. Thereafter, the neural transformer model learns the values for each embedding. Upon the completion of the training phase, the embeddings for each token/subtoken and the position embeddings are saved into respective matrices for later use in the inference phase. There is a token/subtoken embedding matrix, $W_e$, that contains an embedding vector for each token/subtoken $C_i$, i=0 . . . V, and a positional embedding matrix, $W_p$, that contains an embedding vector $P_j$, j=0 . . . T, for each position, where V is the size of the vocabulary and T is the length of the input context tensor.

Each token/subtoken embedding and its corresponding positional embedding are combined to form a context tensor. A tensor is a mathematical object that has indices and components that follow certain transformation rules. It is a generalization of vectors and matrices and represented as an n-dimensional array. The tensor in this instance represents a context of a source code program. The size of the context tensor is T×size of the embedding vector (e.g., embedding size), where T is the length of the token/subtoken sequence.

For each sequence of each batch in each epoch (blocks 602, 604), the T-ordered sequences of subtokens are then mapped into numeric vectors and then into respective subtoken embeddings and positional embeddings (block 606).

An embedding is a learned representation for the text-based subtokens where subtokens that have a common meaning have a similar representation. An embedding is a mapping of discrete categorical variables to a vector of continuous numbers. There is an embedding for each subtoken in the vocabulary and a corresponding positional embedding. The subtoken embedding represents the learned representation for the subtoken. The neural transformer model does not read each subtoken sequentially and as such, has no knowledge of the subtoken's position in a sequence without additional position information. The positional embedding is used to embed position information about a subtoken's position in a sequence into the neural transformer model.

Initial values are generated for the subtoken embedding and positional embeddings of each sequence which are then used to form a context tensor. Thereafter, the neural transformer model learns the values for each embedding. Upon the completion of the training phase, the embeddings for each subtoken and the positional embeddings are saved into respective matrices for later use. There is a subtoken embedding matrix, We, that contains an embedding vector for each subtoken $t_i$, i=0 ... V, and a positional embedding matrix, Wp, that contains an embedding vector $P_j$, j=0 ... T, for each position, where V is the size of the vocabulary and T is the length of the subtoken sequence. (Collectively, block 608).

The first encoder block of the neural transformer model takes the context tensor as input and passes it through the multiple layers of multi-head self-attention layer normalization and feed-forward neural network to finally produce a set of hidden representations If there are additional encoder blocks, the output of each encoder block is passed onto the next encoder block with the output of the last encoder block producing the context tensor of a set of hidden representations. The set of hidden representations is passed onto each decoder block. (Collectively, block 608).

The decoder blocks of the neural transformer models take a shifted sequence of an output embedding as input. The masking in the masked multi-head attention layer is used to prevent positions from attending to subsequent positions in the future. The masking combined with the output embeddings shifted by one position ensures that the predictions to position T depend only on the known outputs at positions less than T. Starting with the first token of the output sequence, the subtokens are passed through the self-attention and normalization layers and into the encoder-decoder attention layer, serving as the query for encoder-decoder attention, where the key and value pairs for the attention are the outputs of encoder. The encoder output was calculated with the entire input embedding sequence. (Collectively, block 608).

The feed forward neural networks in the encoder blocks and the decoder blocks are trained iteratively, making multiple passes over the training dataset before converging to a minimum. Each training iteration includes forward propagation, loss calculation, backpropagation steps followed by updating the weights by calculating the weight gradients. The loss function estimates the loss or error which is used to compare how good or bad the predicted results are. In one aspect, the following loss function is used to pre-train the encoder and decoder of the non-terminal expansion model by minimizing the negative log-likelihood of the correct expansion for all non-terminals in x as follows:

$$\mathcal{L}(x_t, \{y_{t\odot i}^*\}_{i\in \tilde{N}(xt)}) = \tfrac{1}{|\tilde{N}(x_t)|}\sum_{i\in \tilde{N}(x_t)} -\log Pe(y_{t\odot i}|x_t, i),$$

where $y_{t\odot i}^*$ is the ground-truth expansion for every non-terminal position $i \in \tilde{N}(x_t)$.

Once the loss is calculated, it is propagated backwards to the hidden layer that contributed directly to the output. In backpropagation, the partial derivatives of the loss function with respect to the trainable parameters are determined. The weight gradients are calculated as the difference between the old values and the new values of the weights. The weights are adjusted to make the loss as small as possible using a gradient descent technique. In one aspect, a Stochastic Gradient Descent (SGD) method is the optimization algorithm used to find the values of parameters of the function that minimizes the loss function. A backpropagation algorithm may be used to update the weights. (Collectively, block 608).

At the completion of each batch, the parameters of the neural transformer model are updated at a preconfigured frequency denoted as Naccum. Naccum is the gradient accumulation frequency and in one aspect has a value of 4. The parameters include the subtoken embeddings and the positional embeddings which are stored in a respective embedding matrix. (Collectively, block 610).

Attention now turns to a description of the pre-training of the non-terminal selector model Pre-Training Non-Terminal Selector Model The non-terminal selector model is trained through reinforcement learning. Reinforcement learning is a technique that uses a system of rewards and penalties to compel the non-terminal selector model to learn to solve a problem by itself. The non-terminal selector model learns to predict the position of the most likely non-terminal symbol of an input sequence to expand by maximizing a reward. The model learns through interactions between an active decision-making agent and its environment (e.g., training dataset).

Reinforcement learning differs from supervised learning and unsupervised learning. In supervised learning, a model learns from a training dataset of labeled examples. Each sample in the training dataset contains a correct action that the model should take. The model learns to generalize its actions in order to act in situations not present in the training dataset. In unsupervised learning, the model learns to find patterns or structure hidden in the training dataset of unlabeled data. By contrast, reinforcement learning maximizes a reward gradually observed on its outputs during its training instead of trying to find hidden patterns and structure in the unlabeled training dataset.

In reinforcement learning an actor interacts over time with its environment to achieve a goal and learns the actions that produce the most reward by trying them. The actor (e.g., neural network) observes the current state of the environment (e.g., tuples) to decide which action to take (e.g., prediction of next token in a code sketch). The environment changes state and produces a reward for that action. The reward indicates whether the action was good or bad. A penalty is imposed when the action is bad. The cycle of observation, action, and reward is repeated until the learning is complete.

The actor uses a function or policy that maps the inputs into the actions or outputs. The environment uses the reward as feedback on the action. The goal of the training phase is for the Ps model to learn the optimal policy. The non-terminal selector model comprises a neural network which learns the optimal policy that maps a large set of observations into a set of actions that control the environment. The neural network includes an activation function, a number of hidden layers, and a number of neurons in each layer. The learning algorithm generates the weights and biases for the nodes in the neural network that produce the optimal action.

In one aspect, the neural network is trained using a policy-based learning method. The policy-based learning method differs from traditional training methods that optimize a maximum-likelihood loss or cost function (e.g., cross entropy loss). Instead, the policy-based learning method maximizes a specific, potentially discrete, non-differentiable metric instead of optimizing a maximum-likelihood loss function.

In one aspect, self-critical policy gradient training is used to train the neural network to minimize the following function using a reward function $r(\hat{x}, x^*)$ measuring the quality of a sketch $\hat{x}$ given a ground truth sequence of terminals $x^*$ as follows:

$$\mathcal{L}_{train}(x_0, x^*) = (\tilde{r}(x_{out}, x^*) - r(x_0))\Sigma_{t=0}^{T}(-\log Ps(i_t|x_t) - \mathbb{1}_{(i_t \neq \emptyset)}\log Pe(y_{t,i}|x_t, i_t)),$$ (1)

where t is the index of an input training sequence, $\mathbb{1}(\cdot)$ is the indicator function, $x_0$ is the input sequence, $x^*$ is the ground truth sequence of terminals, and $\tilde{r}(x_0)$ is the reward achieved by the prediction from the snapshots of Ps and Pe that achieved the best score so far. Minimizing $\mathcal{L}_{train}$ is equivalent to maximizing the conditional likelihood of the sampled sequence $x_0$ if it obtains a higher reward than $x^*$ thereby increasing the reward expectation of the model.

The reward function is computed by an evaluation metric that compares the generated sequence $x_{out}$ to the corresponding ground truth sequence, $x^*$. In one aspect, the evaluation metric is an average of REGEXACC and ROUGE as follows:

$$r(\hat{s}, s^*) = \frac{1}{2}(\text{REGEXACC}(\hat{s}, s^*) + \text{ROUGE}(\text{ERASE-HOLES}(\hat{s}, s^*)),$$ (2)

where $\hat{s}$ is an output sketch, $s^*$ is a ground truth sequence that does not contain any non-terminals,
where $$\text{REGEXACC}(\hat{s}, s^*) \triangleq \left(\frac{nTerm(\hat{s})}{nTerm(s*)}\right) * \text{matches}(toRegex(\hat{s}), s^*),$$

and
where $toRegex(\hat{s})$ turns a predicted sketch s into a regular expression by replacing all holes with the wildcard matching any non-empty sequence (".+" in Perl Compatible Regular Expression syntax),
where REGEXACC returns a score of 1 if the REGEXACC matches the ground truth, (i.e., matches (•,•), otherwise it returns 0, and
where nTerm(a) is a function that returns the number of terminal symbols in a.

Recall-Oriented Understudy for Gisting Evaluation (ROUGE) is a set of metrics that is used herein to evaluate the quality of the predicted sketch compared to the ground truth code snippet. ROUGE counts the number of overlapping tokens sequences between the generated sketch $\hat{s}$ and the ground-truth code $s^*$.

In other aspects, the reward function may be based on a Bilingual Evaluation Understudy (BLEU) score, a negative Levenstein distance, or combination thereof.

Figure 7:
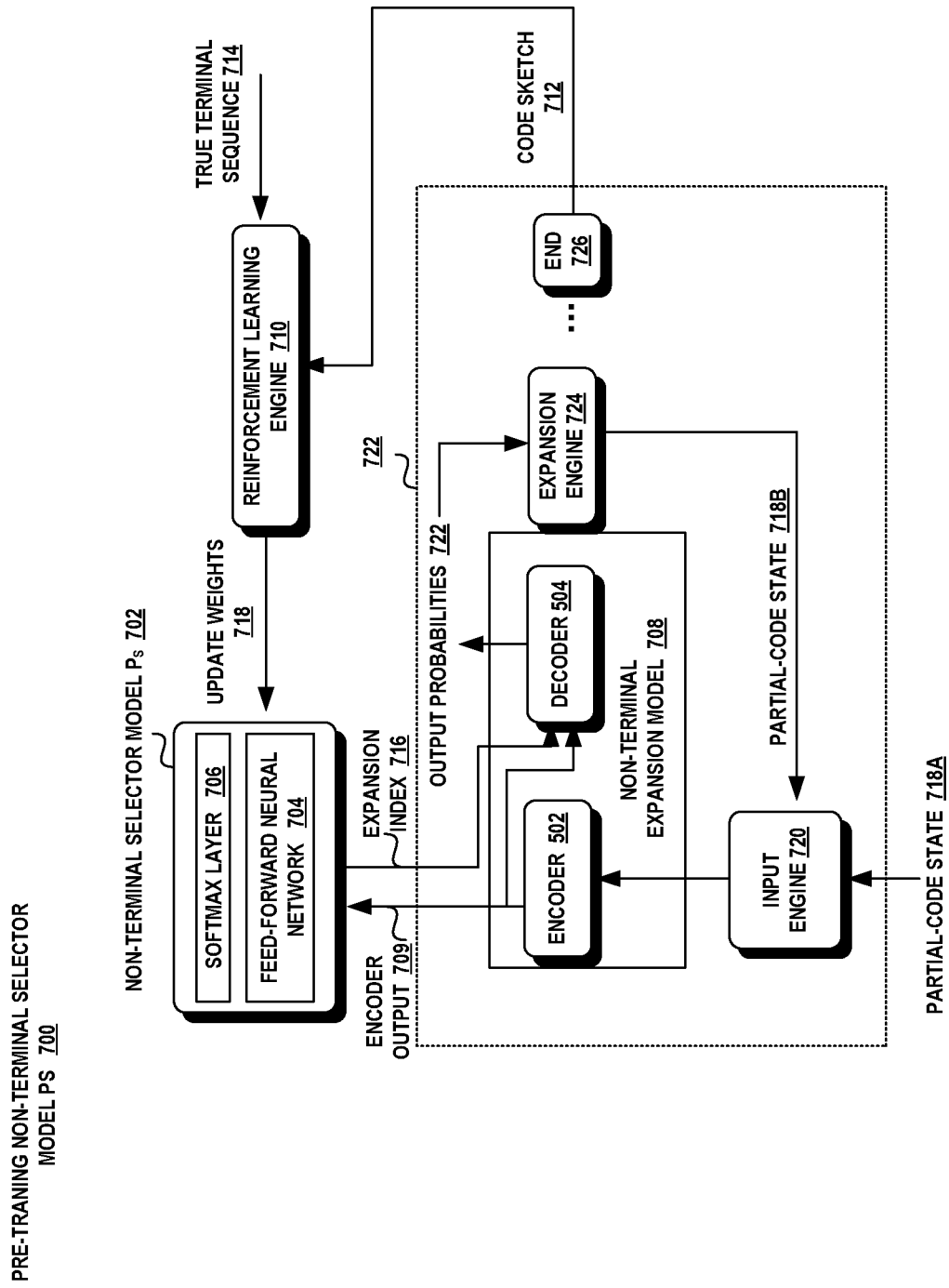
FIG. 7 is an exemplary pre-training configuration of the non-terminal selector model through reinforcement training with the pre-trained non-terminal expansion model.

Turning to FIG. 7, there is shown an exemplary configuration for pre-training the non-terminal selector model through reinforcement learning 700. The non-terminal selector model 702 includes a feed-forward neural network 704 and a softmax layer 706. The pre-trained non-terminal expansion model Pe 708 includes the encoder blocks 502 and decoder blocks 504 described above. The input sequence received by the encoder includes a partial-code state 718A. The output of the encoder of the pre-trained non-terminal expansion 709 is received by the non-terminal selector model 702 which generates an expansion index 716 that is used by the encoder-decoder multi-head attention layer of the decoder 504.

The non-terminal expansion model is utilized to predict a code sketch 712 using the iterative process shown in block 722. An initial partial-code state 718A is received by the encoder 502 which outputs an encoding 709 that is input to the non-terminal selector model 702. The non-terminal selector model predicts an expansion index and the non-terminal expansion model 708 predicts the expansions by generating the output probabilities 722. The expansion engine 724 generates an expansion which is denoted as partial-code state 718B which is then received by the input engine 720. The process repeats until the expansion engine 724 reaches an end state 726 which is when there are no more non-terminals to expand resulting in code sketch 712.

A reinforcement learning engine 710 computes the reward using equation (1) above by measuring the quality of the predicted code sketch 712, output by the decoder, given its true terminal sequence 714. The true terminal sequence is the sequence of terminals that the partial-code state should be expanded to. If the value of the reward is positive, then the weights of the non-terminal selector model are updated through backpropagation to further increase the probability of selecting the given non-terminal index. If the value of the reward is negative, the weights of the non-terminal selector model is updated to decrease the probability of the given non-terminal index.

Attention now turns to a further description of the method for pre-training the non-terminal selector model.

Figure 8:
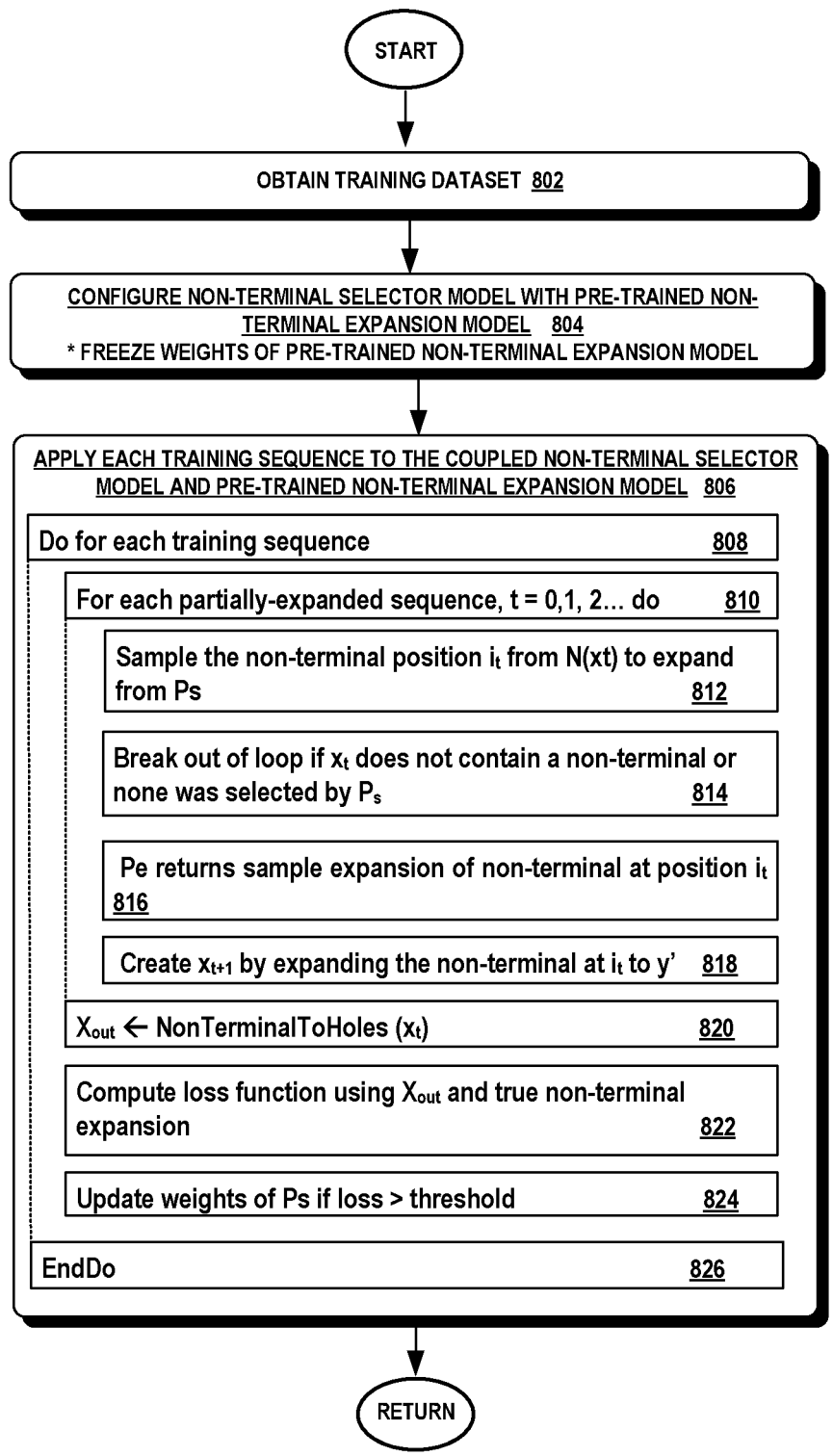
FIG. 8 is a flow diagram illustrating an exemplary method for pre-training the non-terminal selector model of FIG. 7.

Turning to FIG. 8, a training dataset of partial-code states is obtained. (Collectively, block 802).

The models are configured as shown in FIG. 7 with the weights of the non-terminal expansion model Pe frozen. The weights of the model are frozen by disabling the gradient computation and the backpropagation in all the layers of the non-terminal expansion model. These weights include all the weight variables in a layer, the trainable weights updated by the model in the forward pass and the weights in the normalization layer that keep track of the mean and variance of the inputs during training. (Collectively, block 804).

Each partial-code state of the training dataset is applied to the coupled models as shown and described in FIG. 7. A tuple is transformed into a respective embedding by parsing the code snippet of the partial-code state, extracting tokens which are then split into subtokens using BPE. A partial-code state consists of a sequence of non-terminal symbols and/or terminal symbols denoted as $x_t = x_{t,0}, x_{t,1}, \ldots, x_{t,n}$, where $x_{t,i} \in \Sigma \cup N$, N is a set of non-terminal symbols, $\Sigma$ is the set of terminal symbols, and t is the index of a partially-expanded sequence. A special stop symbol is utilized to indicate that no non-terminal index should be further expanded. (Collectively, block 806).

For each of the training sequences and for each of the partially-expanded sequences associated with a training sequence (blocks 808, 810), the non-terminal selector model Ps yields a probability distribution over $N(x_t)$ sampling the index $i_t$ of the non-terminal to be expanded next or the special stop symbol (block 812). If the non-terminal selector model indicates that the special stop symbol is the most likely index of the non-terminal symbol to expand or that $x_t$ does not contain any non-terminal symbols, then the generation process stops (block 814) and processing continues (block 820).

If the non-terminal selector model generates a valid index of the non-terminal symbol to expand, the non-terminal expansion model uses the index to predict an expansion $\hat{y}_t \odot it$ at position $i_t$ (block 816). A new partial-code state $x_{t+1}$ is generated by expanding the non-terminal at position $i_t$ to $\hat{y}_t \odot it$ (block 818). The loop (blocks 810-818) is repeated until the sequence $x_t$ contains all terminal symbols or the special stop symbol is selected. The special stop symbol indicates that the non-terminals should not be further expanded, but instead should be replaced by holes.

The remaining non-terminal symbols are converted into holes through the function NonTerminalToHoles which generates the sequence Xout (block 820). The reinforcement learning engine 710 computes the reward function r( ) and the loss function of equation (1) above using Xout and the ground truth sequence of terminals (block 822). The weights of the non-terminal selector model are updated to minimize the loss (block 824). The process is repeated (block 826) until all of the entire training sequences are expanded (blocks 808-826).

Fine-Tuning

Once the non-terminal selector model and the non-terminal expansion model are pre-trained, both models are fine-tuned with all model parameters (e.g., weights and biases) updated when the reward of equation (1) above indicates that the predicted code sketch is of a poor quality.

Figure 9:
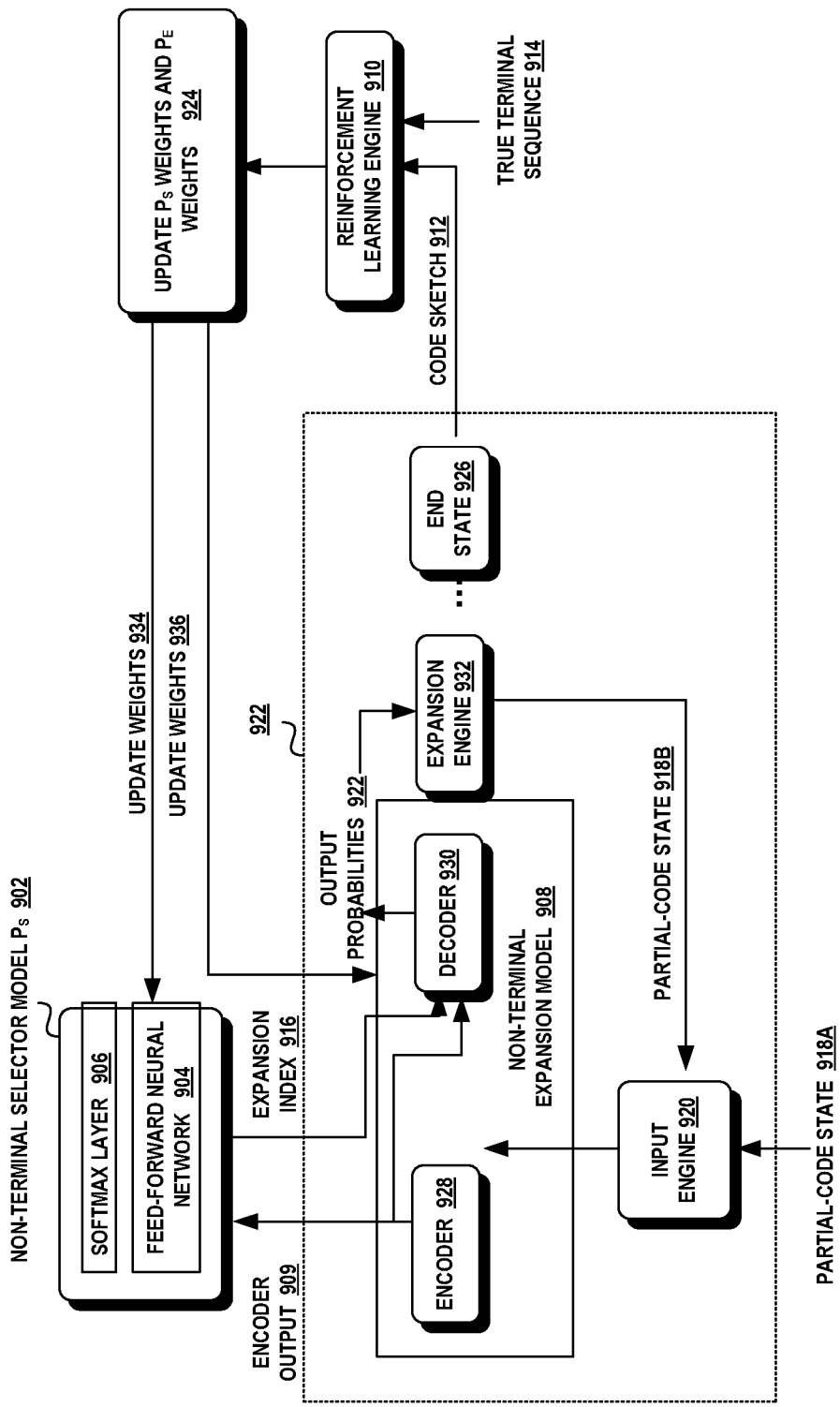
FIG. 9 is an exemplary configuration of the fine-tuning of the coupled non-terminal selector model and the non-terminal expansion model through reinforcement learning.

Turning to FIG. 9, there is shown an exemplary configuration of the coupled non-terminal selector model and the non-terminal expansion model for fine-tuning 900. The fine-tuning dataset consists of partial-code states. The pre-trained non-terminal expansion model 904 includes encoder blocks 906 and decoder blocks 908. The encoder of pre-trained non-terminal expansion model 904 receives embedded sequences of the fine-tuning dataset and generates an encoder output 910 that is received by the non-terminal selector 912. The non-terminal selector model 912 includes a feed-forward neural network 914 and a softmax function 916 which predicts the index of the non-terminal symbol that should be expanded. This expansion index 918 is sent to the decoder.

The non-terminal expansion model is utilized to predict a code sketch 912 using the iterative process shown in block 922. An initial partial-code state 918A is received by the encoder 928 which outputs an encoding 909 that is input to the non-terminal selector model 902. The non-terminal selector model 902 predicts an expansion index and the non-terminal expansion model 908 predicts the expansions by generating the output probabilities 922. The expansion engine 932 generates an expansion which is denoted as partial-code state 918B which is then received by the input engine 920. An expansion is the application of a production rule to a non-terminal symbol. The process repeats until the expansion engine 932 reaches an end state 926 which is when there are no more non-terminals to expand resulting in code sketch 912.

The code sketch 912 is analyzed with the true terminal sequence 914 by the reinforcement learning engine 910. The reinforcement learning engine 910 computes the reward using the predicted code sketch 912 and the true terminal sequence 914. Using the reward, it computes the loss of equation (1) above and updates the weights of the non-terminal expansion model 936 (e.g., attention weights and biases, weights and biases of each neural network layer including the normalization layers) towards minimizing the loss. The weights of the non-terminal selector model 902 are also updated 934 (e.g., weights of 904) towards minimizing the loss function of equation (1).

Figure 10:
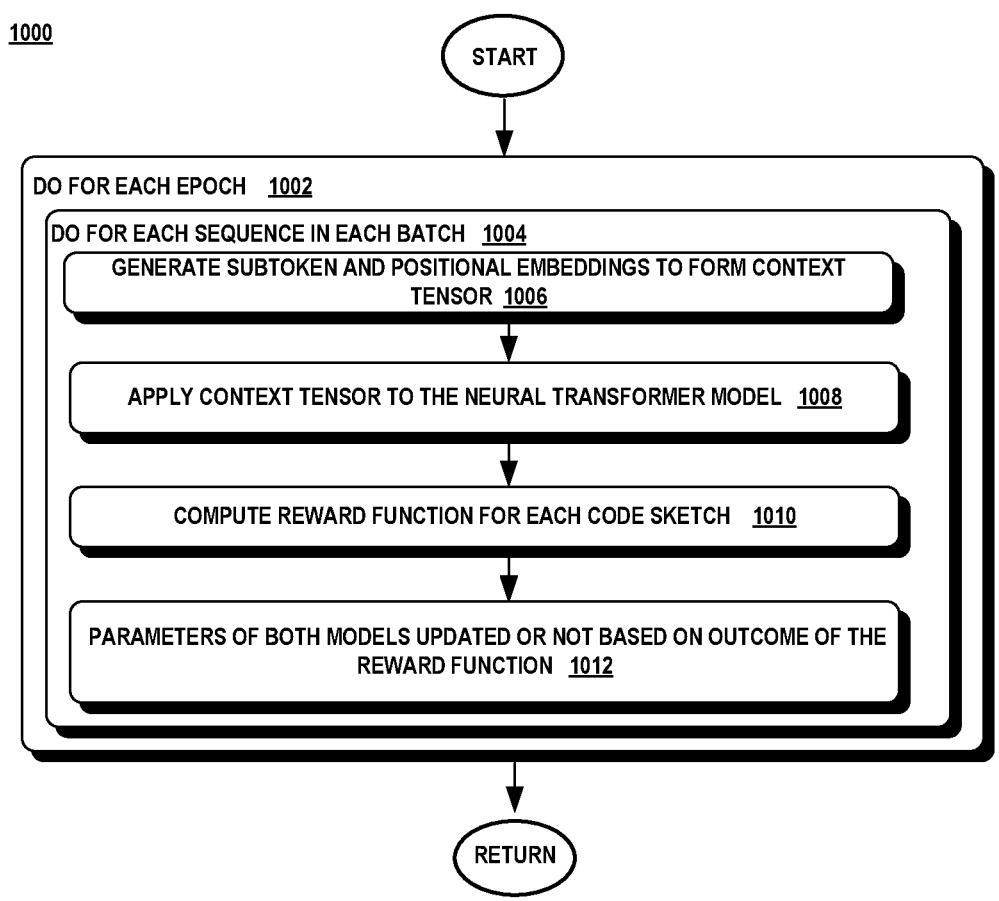
FIG. 10 is a flow diagram illustrating an exemplary method for fine-tuning the coupled non-terminal selector model and the non-terminal expansion model.

Turning to FIG. 10, for each training sequence of each batch in each epoch (blocks 1002, 1004), the T-ordered sequences of subtokens are then mapped into numeric vectors and then into respective subtoken embeddings and positional embeddings input into a context tensor (block 1006). The context tensor is applied to the coupled models as described above with respect to FIG. 9 (block 1008). The reward is computed for the predicted code sketch (block 1010). When the reward indicates that the code sketch is poor, the parameters of the non-terminal selector model are updated in addition to the weights of the non-terminal expansion model (block 1012). If the reward indicates that the code sketch is satisfactory, the weights and parameters are not updated (block 1012).

Attention now turns to a discussion of the inference phase.

Inference Phase

The inference phase uses a two-step beam search to generate code sketches given a partial-code state where each beam search utilizes a model to make predictions. A beam search uses a breadth-first search to build a search tree. At each level of the search tree, the k best states are expanded to the next level, where k is the beam width. Each of the k best states is expanded to successor states by expanding a non-terminal symbol until either the special stop symbol is predicted as the next best state or the non-terminal expansion model indicates that a hole is to replace a non-terminal symbol.

In the first beam search step, the top-M non-terminal positions to expand for a given token sequence $x_t$ is predicted by the non-terminal selector model $P_s$. For each of these M positions, the non-terminal expansion model $P_e$ predicts in a second beam search step, the top-N expansions. For all the k*N*M combinations, the likelihood of each combination is computed and the top-k predictions are kept and output to the user.

A beam search is used to generate consecutive predictions that depend on each other such as where a non-terminal expansion at time t−1 affects the prediction at time t. An easy solution would be to pick the best expansion at each time given what has been expanded to far and to pick the next best expansion. This greedy approach results in a "local optima" problem where the solution is optimal for a neighboring set of solutions but fails for finding the optimal solution among all possible solutions. Instead, the beam search keeps a list of the M most promising candidates and expands each of them, yielding M×N candidate expansions. Then, the top-M candidates are kept. This alleviates the "local optima" problem.

FIG. 11 is an exemplary method of the inference phase. A partial-code state is obtained for which a related source code snippet is generated. In one aspect, the partial-code state represents the context of a source code snippet under development in a source code editor or integrated development environment that needs to be completed to construct a complete line of code, a complete method body, and the like. Alternatively, the partial-code state may be obtained from a natural language comment that specifies the functionality of the code to be generated or a code summary.

The context of a source code snippet is parsed into a partial-code state and then into an input sequence having at least one non-terminal symbol and zero or more terminal symbols. A beam is a tuple that represents a candidate code sketch and consists of a partial-code state, x, a log probability p, and the flag IsDone. The log probability p represents the accumulated log probabilities, p, ps, and pe, generated for the code sketch during the first-step beam search and the second-step beam search, where ps is the log probability computed from the non-terminal selector model and pe is the log probability computed by the non-terminal expansion model.

A beam is initialized for the initial code sketch which consists of the partial-code state, $x_0$, a log probability of 0, and the flag, isDone, set to false. When the flag, isDone, is set to false, it indicates that the beam still needs to be expanded and when the flag is set to true, isDone indicates that the expansion of the beam is completed. (Collectively, blocks 1102).

The method iterates while the beam contains an incomplete generation (blocks 1106-1126). An incomplete generation exists when a state of the beam has isDone set to false. A set of candidate code sketches b' is initialized to empty (block 1108).

The inner loop (blocks 1110-1124) iterates for each code sketch (x, p, isDone) in the beam. If a code sketch is complete (block 1112—yes), then the process adds the code sketch to the set of candidate code sketches b' and continues to expand other partial-code states in the beam (block 1110).

Otherwise, the code sketch is expanded by finding the top M most likely non-terminal positions i in the code sketch to expand from the non-terminal selector model. The non-terminal selector model Ps is given the code sketch x and the model returns an output probability for each non-terminal symbol in the set of non-terminal symbols, N(x). The output probability indicates the likelihood of a non-terminal symbol in the code sketch to be expanded next given the sequence of symbols in code sketch x. The M non-terminal symbols having the highest probability are selected and their corresponding position i in the code sketch x. It should be noted that the non-terminal selector model Ps may indicate that there is not any non-terminal symbol that can be expanded. In this case, the non-terminal selector model may utilize a special stop symbol to indicate that no expansion is possible. (Collectively, block 1114).

The method iterates for each of the M non-terminal symbols (blocks 1114-1124). The log probability of a non-terminal symbol is saved in variable ps (block 1116). If the selected non-terminal symbol is the special stop symbol, then the set of candidate code sketches b' is updated with the code sketch x, and its log probability ps, with isDone set to true (block 1118). The method iterates for another partial-code state in the beam (block 1110).

For each of the top M non-terminal symbol positions, the non-terminal expansion model is invoked to predict the most likely expansions for each selected non-terminal symbol (block 1120). The non-terminal expansion model generates an output probability for each production rule in the grammar in the programming language. A production rule is used to generate an expansion of one of the N selected non-terminal symbols. The top N expansions are considered (block 1122) and the set of candidate code sketches b' is updated with the code sketch including the expansion y and the updated accumulated log probability, p+ps+pe (block 1124).

When the M*N combinations are evaluated, the top k candidate code sketches are obtained from the set of candidate code sketches b' based on the highest accumulated log probability score (block 1126). Any remaining non-terminals in a top k candidate code sketch are replaced with a hole (block 1128). The top k candidate code sketches are returned to the target environment (block 1130).

Figure 13:
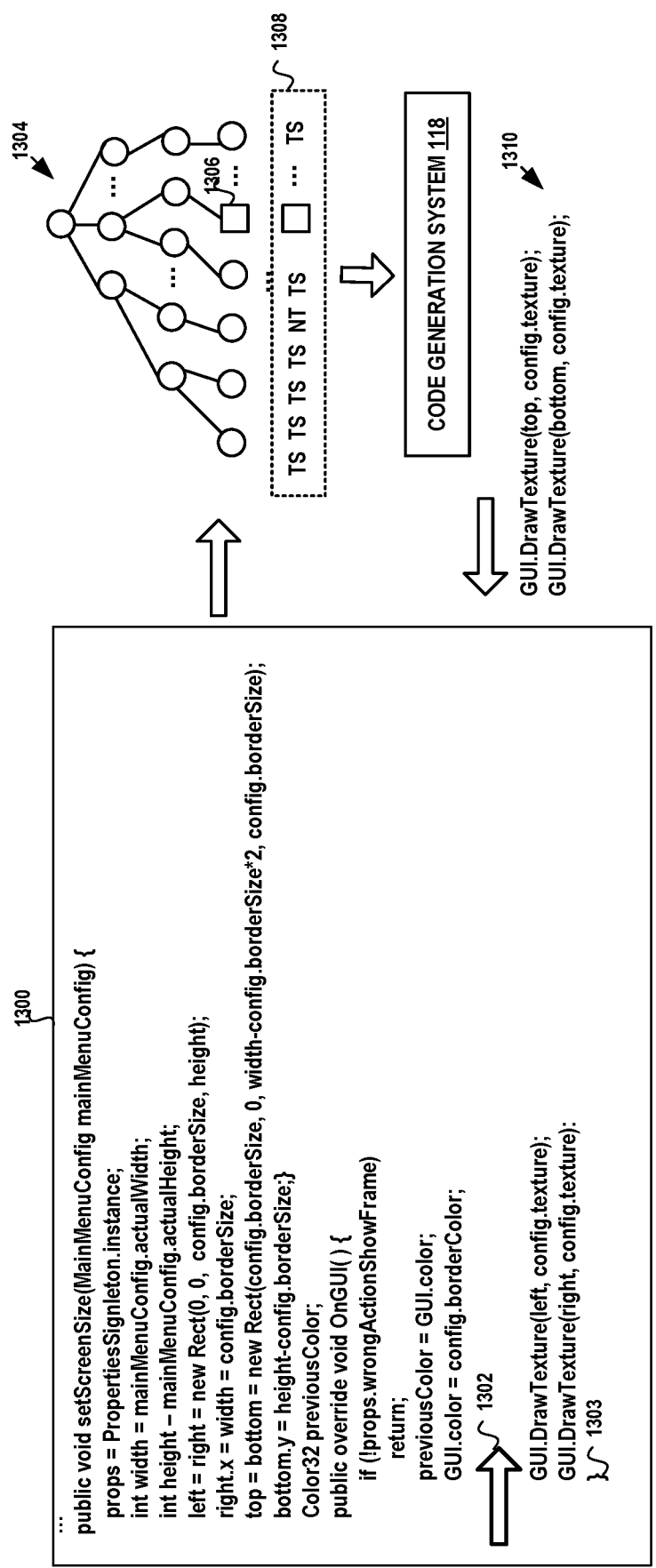
FIG. 13 is a schematic diagram illustrating generation of a code sketch in an edit session.

Attention now turns to a discussion of an exemplary scenario of the code generation system generating a code sketch in an edit session. Turning to FIG. 13, there is shown an exemplary C# program 1300 in a source code editor or the like (e.g., IDE, software development environment). The developer attempts to insert additional source code at position 1302. The source code preceding position 1302 and the source code following position 1302, up to the end bracket of the method OnGUI( ) 1303, are parsed into parse tree 1304 from which a partial-code state 1308 is produced. The partial-code state 1308 includes a sequence of terminal symbols TS, non-terminal symbols NT, and a squash non-terminal symbol □ 1306. The squash non-terminal symbol 1306 represents a position where the code sketch is to be inserted.

The partial-code state 1308 is input to the code generation system 118 which generates a code sketch 1310 that includes two lines of source code that are inserted in position 1302. It should be noted that the code sketch may include holes although none are shown in code sketch 1310.

Exemplary Operating Environment

Figure 12:
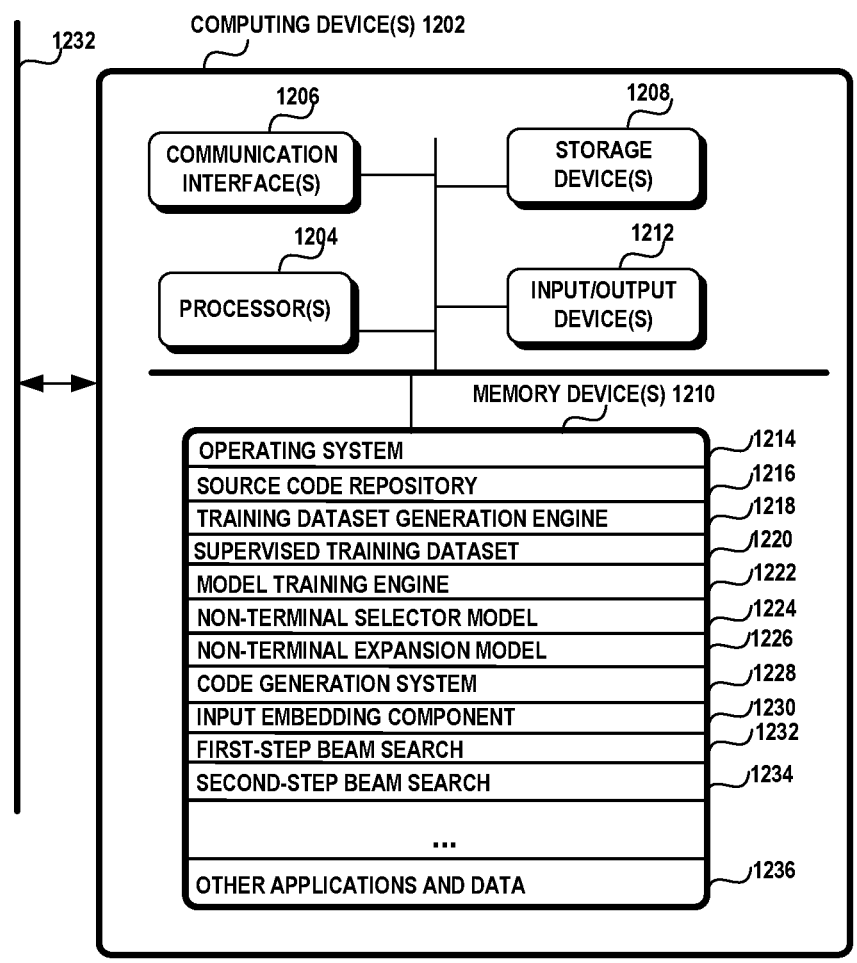
FIG. 12 is a block diagram illustrating an operating environment.

Attention now turns to a discussion of an exemplary operating environment. FIG. 12 illustrates an exemplary operating environment 1200 in which one or more computing devices 1202 are used to train the non-terminal selector model and the non-terminal expansion model and use the models in a code generation system.

However, it should be noted that the aspects disclosed herein is not constrained to any particular configuration of devices. In one aspect, the computing devices 1202 may be part of cloud service that provides access to the trained non-terminal selector and expansion models over a network via application programming interfaces (APIs) from client devices. A client device may invoke one or more of the Pe and Ps models, through the APIs, to generate predictions and/or to generate a code snippet. In another aspect, one or more computing devices 1202 may be used to train the models and other computing devices 1202 may utilize the models in a code generation system. It should be noted that the operating environment is not limited to any particular configuration and other configurations are possible.

A computing device 1202 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 1200 may be configured in a network environment, a distributed environment, a multi-processor environment, or a stand-alone computing device having access to remote or local storage devices.

A computing device 1202 may include one or more processors 1204, one or more communication interfaces 1206, one or more storage devices 1208, one or more input/output devices 1212, and one or more memory devices 1210. A processor 1204 may be any commercially available or customized processor and may include dual microprocessors and multi-processor architectures. A communication interface 1206 facilitates wired or wireless communications between the computing device 1202 and other devices. A storage device 1208 may be computer-readable medium that does not contain propagating signals, such as modulated data signals transmitted through a carrier wave. Examples of a storage device 1208 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 1208 in the computing devices 1202. The input/output devices 1212 may include a keyboard, mouse, pen, voice input device, touch input device, display, speakers, printers, etc., and any combination thereof.

A memory device or memory 1210 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory 1210 may also include one or more external storage devices or remotely located storage devices that do not pertain to propagated signals, such as modulated data signals transmitted through a carrier wave.

A memory device 1210 may contain instructions, components, and data. A component is a software program that performs a specific function and is otherwise known as a module, program, and/or application. The memory device 1210 may include an operating system 1214, source code repository 1216, training dataset generation engine 1218, supervised training dataset 1220, model training engine 1222, non-terminal selector model 1224, non-terminal expansion model 1226, code generation system 1228, input embedding component 1230, first-step beam search 1232, second-step beam search 1234, and other applications and data 1236.

A computing device 1202 may be communicatively coupled via a network 1232. The network 1232 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portion of the Public Switched Telephone Network (PSTN), plain old telephone service (POTS) network, a wireless network, a WiFi® network, or any other type of network or combination of networks.

The network 1232 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

Conclusion

A system is disclosed comprising: a processor and a memory. The memory includes executable instructions that when executed by the processor perform actions that: access a first deep learning model configured to predict whether a non-terminal symbol exists to be expanded given a partial-code state that represents a partially-formed code snippet; access a second deep learning model configured to predict an expansion of a non-terminal symbol predicted by the first deep learning model, wherein the expansion replaces the predicted non-terminal symbol in accordance with a production rule of a grammar of a programming language of the partially-formed source code snippet; obtain a partially-formed source code snippet; and execute the first deep learning model and the second deep learning model to generate a code sketch to complete the partially-formed source code snippet, wherein the code sketch includes a source code snippet with at least one hole.

In an aspect, the memory includes executable instructions that when executed by the processor perform actions that: output the code sketch in a program containing the partially-formed source code snippet. In an aspect, the memory includes executable instructions that when executed by the processor perform actions that: parse the partially-formed source code snippet into a target partial-code state, the target partial-code state including at least one non-terminal symbol; and apply the target partial-code state to the first deep learning model to determine the top-M predicted non-terminal symbols to expand from the target partial-code state.

In an aspect, the memory includes executable instructions that when executed by the processor perform actions that: for each of the top-M predicted non-terminal symbols, execute the second deep learning model to predict top-N expansions of each predicted non-terminal; and generate additional partial-code states for each of the M*N expansions.

In an aspect, the memory includes executable instructions that when executed by the processor perform actions that: accumulate an aggregated probability for each of the M*N expansions, the aggregated probability based on a probability of each expansion and a probability of each predicted non-terminal symbol in the partial-code state that is expanded.

In an aspect, the memory includes executable instructions that when executed by the processor perform actions that: select, as code sketches, the top-k partial-code states based on a highest aggregated probability; and replace each non-terminal symbol in the code sketches with a hole.

In an aspect, the second deep learning model predicts no expansion is possible for the non-terminal symbol predicted by the first deep learning model. In an aspect, the first deep learning model is a multilayer perceptron model trained through reinforcement learning. In an aspect, the second deep learning model is an encoder-decoder neural transformer model with attention trained through reinforcement learning.

A computer-implemented method is disclosed, comprising: accessing a non-terminal expansion model that predicts whether or not to expand a non-terminal symbol given a code sketch representing a partially-formed source code snippet; obtaining a first training dataset including a plurality of partial-code states; training a non-terminal selector model, through reinforcement learning, to predict a non-terminal symbol to expand using the first training dataset; and fine-tuning the non-terminal expansion model and the non-terminal selector model jointly, using the first training dataset to maximize a reward based on a predicted code sketch and a true terminal sequence.

In an aspect, the method further comprises: creating a supervised training dataset including a plurality of triplets, a triplet including a partial-code state, an index of a position of a non-terminal symbol and a true non-terminal expansion; and training the non-terminal expansion model using the supervised training dataset. In an aspect, the reward is based on an evaluation metric applied to the predicted code sketch and the true terminal sequence. In an aspect, the non-terminal selector model is a multilayer perceptron.

In an aspect, training the non-terminal selector model further comprises: updating weights of the multilayer perceptron based on a value of the reward. In an aspect, the non-terminal expansion model is an encoder-decoder neural transformer model with attention. In an aspect, fine-tuning the non-terminal expansion model and the non-terminal selector model jointly further comprises: updating weights of the neural transformer model with attention based on outcome of the reward.

A device is disclosed comprising: a processor and a memory. The processor is configured to perform acts that: access a pre-trained non-terminal expansion model configured to predict an expansion of a non-terminal symbol of a partial-code state, wherein the partial-code state represents a partially-formed code snippet, the partial-code state having at least one non-terminal symbol; execute the pre-trained non-terminal expansion model to predict a code sketch given a target partial-code state; and train a non-terminal selector model to learn through reinforcement learning to predict a non-terminal symbol to expand in the target partial-code sketch, wherein the reinforcement learning includes application of a reward function based on a comparison of the predicted code sketch with a true terminal sequence.

In an aspect, the reward function optimizes a discrete non-differentiable metric. In an aspect, the pre-trained non-terminal expansion model is an encoder-decoder neural transformer model with attention trained on a supervised dataset. In an aspect, the processor is configured to perform acts that: fine-tune the non-terminal selector model and the non-terminal expansion model jointly through reinforcement learning using a plurality of partial-code states and corresponding true terminal sequences.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, a method illustrates operations for the systems and devices disclosed herein.

What is claimed:

1. A system for grammar-based code generation comprising:
    a processor and a memory;
    wherein the memory includes executable instructions that when executed by the processor perform actions that:
    obtain a partially-formed source code snippet of a source code program associated with a programming language, wherein the programming language is associated with a grammar comprising a plurality of production rules, a set of non-terminal symbols, and a set of terminal symbols, wherein a production rule replaces a non-terminal symbol with one or more terminal symbols or one or more non-terminal symbols;
    transform the partially-formed source code snippet into a partial code state comprising at least one non-terminal symbol; and
    generate a code sketch to complete the partially-formed source code snippet, wherein the code sketch comprises an output sequence of terminal symbols and at least one hole,
    wherein the generation of the code sketch uses a non-terminal selector model to predict a select non-terminal symbol in the partial code state to expand and a non-terminal expansion model to predict a select production rule to expand the select non-terminal symbol, and
    wherein the hole represents a position in the output sequence where the non-terminal selector model is uncertain about which non-terminal symbol to expand.

2. The system of claim 1, wherein the memory includes executable instructions that when executed by the processor perform actions that:
    output the code sketch in the source code program.

3. The system of claim 1, wherein the memory includes executable instructions that when executed by the processor perform actions that:
    execute a first beam search that uses the non-terminal selector model to predict the select non-terminal symbol to expand; and
    execute a second beam search that uses the non-terminal expansion model to predict the select production rule to expand the select non-terminal symbol.

4. The system of claim 1, wherein the code sketch generates source code to complete a line of source code, a method body, a class, an expression, or a consecutive set of lines of source code.

5. The system of claim 1, wherein the non-terminal selector model is a multilayer perceptron model trained through reinforcement learning.

6. The system of claim 1, wherein the non-terminal expansion model is an encoder-decoder neural transformer model with attention trained through reinforcement learning.

7. A computer-implemented method for grammar-based code generation, comprising:
    accessing a partially-formed source code snippet of a source code program associated with a programming language, wherein the programming language is associated with a grammar comprising a plurality of production rules, a plurality of non-terminal symbols, and a plurality of terminal symbols, wherein a production rule is a rule that replaces a first non-terminal symbol with one or more terminal symbols or one or more non-terminal symbols;
    transforming the partially-formed source code snippet into a partial code state comprising at least one non-terminal symbol;

generating a code sketch to complete the partially-formed source code snippet, wherein the code sketch comprises a sequence of terminal symbols and a hole, wherein generating the code sketch comprises invoking a non-terminal selector model to predict a non-terminal symbol to expand in the partial code state and a non-terminal expansion model to predict the production rule that expands the predicted non-terminal symbol, wherein the hole represents an unexpanded non-terminal symbol.

8. The computer-implemented method of claim 7, further comprising:

outputting the code sketch in the source code program.

9. The computer-implemented method of claim 7, further comprising:

executing a first beam search that invokes the non-terminal selector model to predict top-m non-terminal symbols to expand; and for each of the top-m predicted non-terminal symbols, executing a second beam search that invokes the non-terminal expansion model to predict top-n expansions of each of the top-m non-terminal symbols.

10. The computer-implemented method of claim 9, wherein the non-terminal selector model generates an output probability for each non-terminal symbol in the plurality of non-terminal symbols.

11. The computer-implemented method of claim 10, wherein the top-m predicted non-terminal symbols have highest output probabilities.

12. The computer-implemented method of claim 9, wherein the non-terminal expansion model generates an output probability for each production rule.

13. The computer-implemented method of claim 12, wherein the top-n expansions have highest output probabilities.

14. The computer-implemented method of claim 9, further comprising:

expanding each of the predicted top-m non-terminal symbols until a special stop symbol is predicted.

15. The computer-implemented method of claim 9, further comprising:

terminating expansion of a select one of the predicted top-m non-terminal symbols when the non-terminal expansion model predicts a hole to replace a non-terminal symbol.

16. A hardware storage device having stored thereon computer executable instructions that are structured to be executable by a processor of a computing device to thereby cause the computing device to perform actions for grammar-based code completion that:

obtain a partially-formed source code snippet of a source code program in a programming language associated with a grammar comprising a plurality of production rules, a set of non-terminal symbols, and a set of terminal symbols, wherein a production rule is a rule that replaces a non-terminal symbol with one or more terminal symbols or one or more non-terminal symbols;

transform the partially-formed source code snippet into a partial code state comprising at least one non-terminal symbol and a squash non-terminal symbol, wherein the squash non-terminal symbol represents a position where a code sketch is to be inserted into the partially-formed source code snippet; and generate a code sketch to insert into the position of the squash non-terminal symbol, wherein the code sketch comprises a sequence of terminal symbols and a hole, wherein the generation of the code sketch comprises invoking a non-terminal selector model to predict a non-terminal symbol in the partial code state to expand and a non-terminal expansion model to predict the production rule that expands the predicted non-terminal symbol, wherein the hole represents an unexpanded non-terminal symbol.

17. The hardware device of claim 16, wherein the partial code state comprises a first sequence of tokens, the squash non-terminal symbol, and a second sequence of tokens, wherein the first sequence of tokens represents source code preceding the code sketch, wherein the second sequence of tokens represents source code following the code sketch.

18. The hardware device of claim 16, having stored thereon computer executable instructions that are structured to be executable by the processor of the computing device to thereby cause the computing device to perform actions for grammar-based code completion that:

output the code sketch in the source code program.

19. The hardware device of claim 16, wherein the non-terminal selector model is a multi-layer perceptron model.

20. The hardware device of claim 16, wherein the non-terminal expansion model is a neural transformer model with attention.

* * * * *